United States Patent Office 2,826,575
Patented Mar. 11, 1958

2,826,575

3,3'-ALKYLENEBIS(3,4-DIHYDRO-6-PHENYL-2H-1,3-BENZOXAZINES)

Raymond H. Rigterink, Midland, Mich., assignor to The Dow Chemical Company, Midland, Mich., a corporation of Delaware No Drawing. Application May 6, 1957
Serial No. 657,029

3 Claims. (Cl. 260—244)

This invention relates to 3,3'-alkylenebis(3,4-dihydro-6-phenyl-2H-1,3-benzoxazines). The new compounds are characterized by the formula

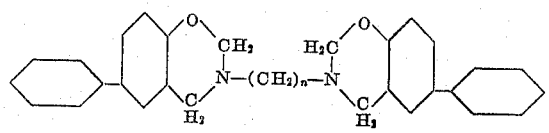

In this and succeeding formulae, $n$ is an integer from 2 to 6, inclusive. These compounds are crystalline solids somewhat soluble in many common organic solvents and of very low solubility in water. The new compounds are useful as parasiticides and adapted to be employed in dust and liquid compositions for the control of many undesirable organisms such as *Alternaria solani*.

The new compounds may be prepared by causing an alkylenediamine having the formula

to react with formaldehyde, or a suitable formaldehyde yielding substance such as paraformaldehyde, to form a formaldehydeamine intermediate condensation product. The latter product is then caused to react with 4-phenylphenol to form the desired product and water of reaction.

In carrying out the first step of the reaction, the alkylenediamine is intimately contacted with formaldehyde in the presence of an inert solvent, such as methanol, ethanol or dioxane as a reaction medium. The contacting of the reactants is carried out with stirring and cooling and at a temperature of from 0° to 70° C. Good results are obtained when employing one molecular proportion of the diamine with four molecular proportions of formaldehyde. The formaldehyde may be employed in any readily available form such as formalin, trioxane and paraformaldehyde. The amount of formaldehyde is calculated on the basis of a monomer unit.

In carrying out the second step of the reaction the 4-phenylphenol or a solution thereof in one of the above named solvents is added portionwise to the reaction mixture prepared as described above. In such operations, two molecular proportions of the phenol are employed for each molecular proportion of diamine used in the preparation of the formaldehydeamine intermediate. The reaction takes place smoothly at the temperature range of from 30° C. to 100° C. During the reaction, the desired product oftentimes precipitates in the reaction mixture as a crystalline solid. Upon completion of the reaction, the reaction mixture may be cooled to precipitate the desired product or to precipitate further product. The product may be separated in conventional manner such as by filtration or decantation and purified by recrystallization from a suitable organic solvent.

The following examples illustrate the invention but are not to be construed as limiting.

Example 1.—3,3'-ethylenebis(3,4-dihydro-6-phenyl-2H-1,3-benzoxazine)

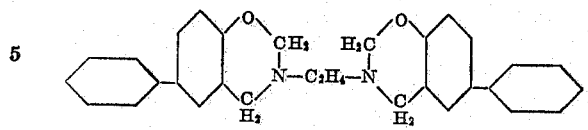

Sixty grams of paraformaldehyde (equivalent to two moles of HCHO), 1.0 gram of potassium hydroxide and 300 milliliters of methanol were mixed together and heated with stirring to the boiling temperature to obtain a clear solution. The reaction vessel and contents were then cooled to room temperature and 30.0 grams (0.5 mole) of ethylenediamine added portionwise to the reaction mixture over a period of about 15 minutes. The addition was carried out with stirring and cooling and at a temperature of from 25° to 30° C. Upon completion of the addition, 170.2 grams (1.0 mole) of 4-phenylphenol was slowly added with stirring and the resulting mixture heated at the boiling temperature (65° C.), and under reflux for two hours. During the heating a 3,3'-ethylenebis(3,4-dihydro-6-phenyl - 2H - 1,3-benzoxazine) product precipitated in the reaction mixture as a crystalline solid. This product was recovered by filtration, washed with aqueous 10 percent sodium hydroxide, and recrystallized from ethyl acetate. The recrystallized product was found to melt at 159°–162° C.

Example 2.—3,3'-hexamethylenebis(3,4-dihydro-6-phenyl-2H-1,3-benzoxazine)

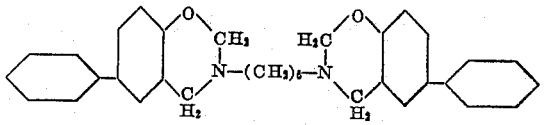

Sixty grams of paraformaldehyde (equivalent to two moles of HCHO), 1.0 gram of potassium hydroxide and 300 milliliters of methanol are mixed together and heated with stirring to the boiling temperature to obtain a clear solution. The reaction vessel and contents are then cooled to room temperature and 58 grams (0.5 mole) of 1,6-hexamethylenediamine is added portionwise to the reaction mixture over a period of about 15 minutes. The addition is carried out with stirring and cooling and at a temperature of from 25° to 30° C. Upon completion of the addition, 170.2 grams (1.0 mole) of 4-phenylphenol is slowly added with stirring and the resulting mixture heated at the boiling temperature, 65° C., and under reflux for 2 hours. During the heating a 3,3'-hexamethylenebis - (3,4-dihydro-6-phenyl - 2H - 1,3 - benzoxazine) product precipitates in the reaction mixture as a crystalline solid. This product is recovered by filtration, washed with aqueous 10 percent sodium hydroxide, and recrystallized from ethyl acetate. 3,3'-hexamethylenebis(3,4-dihydro-6-phenyl-2H-1,3-benzoxazine) has a molecular weight of 456.

In a similar manner other 3,3'-alkylenebis(3,4-dihydro-6-phenyl-2H-1,3-benzoxazines) may be prepared as follows:

3,3' - trimethylenebis(3,4 - dihydro-6-phenyl - 2H - 1,3-benzoxazine) by reacting trimethylenediamine, formaldehyde and 4-phenylphenol.

3,3' - tetramethylene(3,4 - dihydro-6-phenyl - 2H - 1,3-benzoxazine) by reacting tetramethylenediamine, formaldehyde and 4-phenylphenol.

The new compounds are effective as parasiticides for the control of many undesirable organisms. For such use the products may be dispersed on inert finely divided solids, and employed as dusts. Also, such mixtures may be dispersed in water with the aid of a wetting agent, and the resulting aqueous suspensions employed as sprays. In other procedures, the products may be employed as constituents of oil-in-water emulsions, or water dispersions with or without the aid of wetting, dispersing or emulsifying agents. In a representative operation, 3,3'-ethylenebis (3,4 - dihydro-6-phenyl-2H-1,3 - benzoxazine) was dispersed in an aqueous suspension of the spores and mycelial fragments of *Fusarium oxysporium lycopersici* in an amount sufficient to supply 100 parts by weight of the benzoxazine compound per million parts by weight of aqueous suspension. Twenty-four hours later, the treated aqueous suspension and an untreated check suspension of the fungal organism were cultured on agar and the cultures incubated at 25° C. After three days of incubation, observations showed a complete control of the fungal organism treated with the benzoxazine compound. At the time of the observation, the check cultures were found to support a heavy growth of *Fusarium oxysporium lycopersici.*

I claim:

1. A 3,3' - alkylenebis(3,4 - dihydro-6-phenyl-2H-1,3-benzoxazine) having the formula

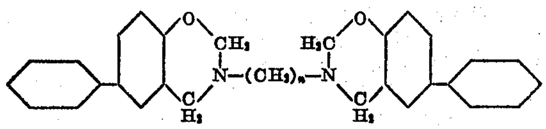

**wherein *n* is an integer from 2 to 6, inclusive.**

2. 3,3' - ethylenebis(3,4 - dihydro - 6 - phenyl-2H-1,3-benzoxazine).

3. A method for the preparation of a 3,3'-alkylenebis-3,4-dihydro-6-phenyl-2H-1,3-benzoxazine) having the formula wherein *n* is an integer from 2 to 6 inclusive, which comprises the steps of (1) reacting an alkylenediamine containing from 2 to 6 carbon atoms, inclusive, with formaldehyde to produce a formaldehyde-amine intermediate condensation product and (2) reacting said condensation product with 4-phenylphenol.

References Cited in the file of this patent

Burke et al.: J. Am. Chem. Soc., 74, 1518–20 (1952).